US012182483B2

(12) United States Patent
Monde et al.

(10) Patent No.: US 12,182,483 B2
(45) Date of Patent: Dec. 31, 2024

(54) METHOD FOR ANALYZING VIBRATION DAMPING STRUCTURE OF A TUBE BUNDLE DISPOSED IN A FLUID

(71) Applicant: MITSUBISHI HEAVY INDUSTRIES, LTD., Tokyo (JP)

(72) Inventors: Masatsugu Monde, Tokyo (JP); Naoki Ono, Tokyo (JP); Masaaki Katayama, Tokyo (JP); Daisuke Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1103 days.

(21) Appl. No.: 16/307,810

(22) PCT Filed: Jul. 21, 2017

(86) PCT No.: PCT/JP2017/026451
§ 371 (c)(1),
(2) Date: Dec. 6, 2018

(87) PCT Pub. No.: WO2018/109973
PCT Pub. Date: Jun. 21, 2018

(65) Prior Publication Data
US 2019/0179986 A1    Jun. 13, 2019

(30) Foreign Application Priority Data
Dec. 12, 2016  (JP) ................. 2016-240191

(51) Int. Cl.
*G06F 30/23* (2020.01)
*F28F 99/00* (2006.01)
(Continued)

(52) U.S. Cl.
CPC .............. *G06F 30/23* (2020.01); *F28F 99/00* (2013.01); *F28D 7/06* (2013.01); *F28F 2200/00* (2013.01);
(Continued)

(58) Field of Classification Search
CPC .......... G06F 30/23; G06F 30/00; G06F 30/17; G06F 30/20; G06F 30/27; G06F 30/28;
(Continued)

(56) References Cited

U.S. PATENT DOCUMENTS

| 10,990,712 B2* | 4/2021 | Iwasaki ................... G06F 30/13 |
| 2009/0164177 A1* | 6/2009 | Hamazoe ................ G06F 30/00 703/1 |
| 2012/0167839 A1* | 7/2012 | Wepfer ................... F22B 37/66 165/69 |

FOREIGN PATENT DOCUMENTS

| JP | 2009-146162 A | 7/2009 |
| JP | 2013-122429 A | 6/2013 |
| JP | 2014-164323 A | 9/2014 |

OTHER PUBLICATIONS

Sauvé et al., "Probabilistic Methods for the Prediction of Damage in Process Equipment Tubes under Nonlinear Flow Induced Vibration", Nov. 16, 1997, pp. 283-290.*
(Continued)

*Primary Examiner* — Brian S Cook
(74) *Attorney, Agent, or Firm* — WHDA, LLP

(57) ABSTRACT

There is provided a method for analyzing a vibration damping structure in which a tube bundle disposed in a fluid is supported by a vibration damping member disposed in a gap between tubes included in the tube bundle. The method includes a model making step of making a FEM model corresponding to the vibration damping structure, an error setting step of setting an error parameter for a parameter relating to an element included in the FEM model, and an analysis step of performing structural analysis by a finite-element method using the FEM model in which the error parameter is set.

4 Claims, 15 Drawing Sheets

(51) Int. Cl.
*F28D 7/06* (2006.01)
*G06F 30/00* (2020.01)
*G06F 119/14* (2020.01)

(52) U.S. Cl.
CPC .......... *F28F 2265/30* (2013.01); *G06F 30/00* (2020.01); *G06F 2119/14* (2020.01)

(58) Field of Classification Search
CPC .... F28F 99/00; F28F 2200/00; F28F 2265/30; F28D 7/06; F28D 2021/0054; F28D 1/00; F28D 1/02; F28D 1/0341; F28D 1/0358; F28D 7/0041; F28D 7/10; F28D 7/0016; F28D 7/0033
USPC .......................................................... 703/2
See application file for complete search history.

(56) References Cited

OTHER PUBLICATIONS

Hassan et al., "A new tube/support impact model for heat exchanger tubes", Dec. 1, 2005, pp. 561-577.*
Sauvé et al., "Probabilistic Methods for the Prediction of Damage in Process Equipment Tubes under Nonlinear Flow Induced Vibration", Nov. 16, 1997, pp. 283-290 (Year: 1997).*
Hassan et al., "A new tube/support impact model for heat exchanger tubes", Dec. 1, 2005, pp. 561-577 (Year: 2005).*
Caldwell_1987 (Industrial Vibration Modelling, 1987). (Year: 1987).*
Vink_2013 (Statistic Tolerance Stack-up Analysis, Vink System Design & Analysis Dec. 16, 2013). (Year: 2013).*
Broch_1984 (Mechanical Vibration and Shock Measurements, Bruel & Kjaer 1984) (Year: 1984).*
Bruel&Kjaer_1982 (Measuring Vibration, 1982) (Year: 1982).*
Joneja_2001 (Drawing, Dimensioning and Tolerancing ANSI 14.5M Dimensioning and Tolerancing, ASME press, Oct. 26, 2001). (Year: 2001).*
Sauvé, R. G. et al, "Probabilistic Methods for the Prediction of Damage in Process Equipment Tubes Under Nonlinear Flow Induced Vibration", 4th International Symposium on Fluid-Structure Interaction, Aeroelasticity, Flow-Induced Vibration and Noise, vol. II, , pp. 283-290, Nov. 16, 1997; Cited in Extended EP Search Report dated Aug. 19, 2019.
Hassan, M.A. et al., "A new tube/support impact model for heat exchanger tubes", Journal of Fluids and Structures, Academic Press, vol. 21, No. 5-7, pp. 561-577, Dec. 1, 2005; Cited in Extended EP Search Report dated Aug. 19, 2019.
Extended Search Report dated Aug. 19, 2019, issued in counterpart EP Application No. 17881035.4 (15 pages).
International Search Report dated Oct. 10, 2017, issued in counterpart International Application No. PCT/JP2017/026451 (1 page).

* cited by examiner

METHOD FOR ANALYZING VIBRATION DAMPING STRUCTURE OF A TUBE BUNDLE DISPOSED IN A FLUID

TECHNICAL FIELD

The present disclosure relates to a method for analyzing a vibration damping structure of a tube bundle disposed in a fluid.

BACKGROUND ART

A tube bundle disposed in a fluid, for instance, a heat-transfer tube bundle used in a heat exchanger such as a steam generator adopts a vibration damping structure in which an anti-vibration bar is disposed in a gap between each tube for suppressing vibration of the tubes in order to prevent the tubes from largely vibrating due to the fluid flowing outside the tubes. It has been recently indicated that self-excited vibration phenomena, such as fluid elastic vibration, can occur along a flow direction of the fluid in this type of tube bundle, namely, a tube bundle having a U-bent portion including a U-shaped tube. The U-shaped tube is supported by an anti-vibration member (vibration damping member) provided in a gap between the tubes. The vibration phenomenon along the flow direction is suppressed by friction between the tube and the anti-vibration member. Since such friction is closely related to the size of a gap between the tube and the anti-vibration member, the suppression of self-excited vibration requires a structural design that generates an appropriate friction force.

Besides, in an actual structure, members including the heat-transfer tube and the anti-vibration bar have manufacturing tolerances such as variation in size, twist, and warpage, thus having some deviation from a designed profile. For instance, Patent Document 1 discloses a tolerance analyzing/calculating system for analyzing and examining a tolerance of each component of a designed structure so that a size tolerance at the time of assembly of the structure is within a predetermined range. More specifically, this document discloses that variance or deviation with respect to the size tolerance of each component is measured, and an appropriate tolerance which satisfies required quality for a design specification value is examined based on the results.

CITATION LIST

Patent Literature

Patent Document 1: JP2009-146162A

SUMMARY

Problems to be Solved

An actual structure having an error within an allowable range is substantially ignorable. However, the above-described vibration damping structure adopted in the steam generator can cause, if an unintended gap exists therein due to an error, significant vibration of the heat-transfer tube or the anti-vibration member by an inner fluid force when the steam generator is operated. Thus, this structure requires a more severe design. In particular, such vibration can cause friction and contact between the members, which can lead to a situation such as breakage of the members. Although the above patent document discloses an analysis method for a typical structure, this method is difficult to precisely evaluate an error of the vibration damping structure disposed in a fluid and showing a complicated behavior. A novel analysis method is therefore desired.

At least one embodiment of the present invention was made in view of the above, and an object thereof is to provide a method for analyzing a vibration damping structure whereby it is possible to perform structural analysis with high precision, taking into consideration an error factor of the vibration damping structure disposed in a fluid.

Solution to the Problems (1) To solve the above problems, according to at least one embodiment of the present invention, a method for analyzing a vibration damping structure in which a tube bundle disposed in a fluid is supported by a vibration damping member disposed in a gap between tubes included in the tube bundle comprises: a model making step of making a FEM model corresponding to the vibration damping structure, an error setting step of setting an error parameter for a parameter relating to an element included in the FEM model; and an analysis step of performing structural analysis by a finite-element method using the FEM model in which the error parameter is set.

In the above method (1), the vibration damping structure to be analyzed is represented by the FEM model to perform structural analysis by the finite-element method. At this time, the error parameter is set for the parameter relating to the element included in the FEM model, which enables structural analysis with high precision, in consideration of an error factor of the vibration damping structure disposed in a fluid.

(2) In some embodiments, in the above method (1), the model making step includes making the FEM model so as to include a first element corresponding to the tube bundle, a second element including a one-dimensional element corresponding to the vibration damping member, and a third element corresponding to a gap amount between the tube bundle and the vibration damping member.

In the above method (2), the vibration damping structure to be analyzed is represented by the first to third elements. Thus, since the FEM model corresponding to the vibration damping structure can be efficiently constructed by limited variable parameters, it is possible to perform structural analysis precisely with reduced computation load.

(3) In some embodiments, in the above method (2), the first element includes a plurality of first one-dimensional elements extending to respectively correspond to the tubes included in the tube bundle, the second element includes a second one-dimensional element extending to correspond to the vibration damping member, and the third element includes a gap element representing a shortest distance between each first one-dimensional element and the second one-dimensional element.

In the above method (3), the first and the second elements are represented by one-dimensional elements while the third element is represented by a gap element disposed therebetween. Thereby, it is possible to construct a FEM model having a considerably simple structure. Such a FEM model efficiently reduces the variable parameters and thus has low computation load and is available for high-speed arithmetic processing.

(4) In some embodiments, in the above method (2) or (3), the analysis step includes imposing a loading condition set so that, when the gap amount is less than a predetermined value, a contact force applied to each first one-dimensional element from the second one-dimensional element increases with an increase in interference.

In the above method (4), the gap amount set as an element (third element) of the FEM model corresponds to the amount of the gap between the tube and the vibration damping member in an actual vibration damping structure. Thus, the loading condition is imposed so that, when the gap amount exceeds a predetermined value, the contact force applied to the first one-dimensional element from the second one-dimensional element increases with an increase in gap amount, whereby it is possible to appropriately simulate the behavior of the contact force mutually acting on the tube and the vibration damping member when they are in contact by computing analysis.

(5) In some embodiments, in the above method (2), the first element includes a plurality of first one-dimensional elements extending to respectively correspond to the tubes included in the tube bundle, the second element includes a second one-dimensional element extending along a longitudinal direction of the vibration damping member and a third one-dimensional element extending along a width direction of the vibration damping member, and the third element includes a pair of gap elements representing a shortest distance between each end of the third one-dimensional element and each first one-dimensional element.

In the above method (5), the second element corresponding to the vibration damping member is represented by the second and third one-dimensional elements in a two-dimensional manner, and the pair of gap elements is provided as the third element between each end of the third one-dimensional element. Thereby, it is possible to reproduce a high-dimensional behavior, such as twist of the vibration damping member with respect to the tube bundle, as a behavior close to reality, and it is possible to achieve more precise structural analysis.

(6) In some embodiments, in the above method (1) to (5), the error parameter includes a random number.

With the above method (6), since the error parameter includes a random number, it is possible to randomize an error of the parameter for which the error parameter is to be set. Generally, errors of actual structural members are statistically uniform. Thus, setting the error parameter in this manner enables accurate reproduction of errors of an actual vibration damping structure and enables precise analysis.

(7) In some embodiments, in the above method (1) to (5), the error parameter is set based on data measured on the vibration damping structure.

With the above method (7), the error parameter is set based on data measured on the vibration damping structure. Thus, even if an actual structure has statistically nonuniform errors due to some factors, appropriate analysis can be performed by setting the error parameter based on the measurement data.

(8) In some embodiments, in the above method (1) to (7), the error parameter includes at least one of an outer diameter, a thickness, and a warpage of a tube included in the tube bundle, and a thickness and a warpage of the vibration damping member.

With the above method (8), since the parameters which tend to affect analysis results in this type of vibration damping structure are set as the error parameter, it is possible to simulate the behavior of an actual structure more closely, and it is possible to perform analysis with high precision.

(9) In some embodiments, in the above method (1) to (8), each of the tubes included in the tube bundle has a first straight tube part positioned on a fluid inlet side, a second straight tube part positioned on a fluid outlet side, and a bent part positioned between the first straight tube part and the second straight tube part, the first straight tube part and the second straight tube part are inserted into a plurality of through holes formed in a tube support plate for supporting the tube bundle, and in the analysis step, the error parameter includes an eccentricity amount of an insertion position, at which the first straight tube and the second straight tube part are inserted into the through holes, to perform the structural analysis.

In the above method (9), structural analysis is performed on the vibration damping structure including the tube bundle and the vibration damping member by the finite-element method using the FEM model, in consideration of a structure in which the straight tube parts of each tube are inserted to the through holes formed in the tube support plate for supporting the tube bundle. Further, in the above method (9), the eccentricity amount of the insertion position of the straight tube parts in the through holes is included in the error parameter to perform the above structural analysis.

Accordingly, with the above method (9), it is possible to perform the structural analysis, in consideration of increase and decrease in contact load when the contact load applied to the vibration damping member from the bent part adjoining the straight tube parts of each tube increases or decreases due to the eccentricity amount of the insertion position of the straight tube parts in the through holes. Further, with the above method (9), it is possible to perform the structural analysis, in consideration of variation due to an error of the eccentricity amount of the insertion position of the straight tube parts in the through holes.

Advantageous Effects

According to at least one embodiment of the present invention, there is provided a method for analyzing vibration damping structure whereby it is possible to perform structural analysis with high precision, in consideration of an error factor of the vibration damping structure disposed in a fluid.

DETAILED DESCRIPTION

A vibration damping structure analysis method according to some embodiments of the present invention will now be described with reference to the accompanying drawings. It is intended, however that unless particularly specified, dimensions, materials, shapes, relative positions and the like of components described in the embodiments shall be interpreted as illustrative only and not intended to limit the scope of the present invention. The vibration damping structure analysis method according to some embodiments of the present invention can be applied to any tube bundle structure in which multiple tubes disposed in a fluid are supported by friction with a supporting member against a fluid force. The structure of the heat-transfer tube bundle shown in FIGS. 1 to 3 will be described as an example of the tube bundle structure to which the vibration damping structure analysis method according to some embodiments of the present invention can be applied. Next, process details of the vibration damping structure analysis method will be described with reference to FIGS. 4 to 12.

Figure 1:
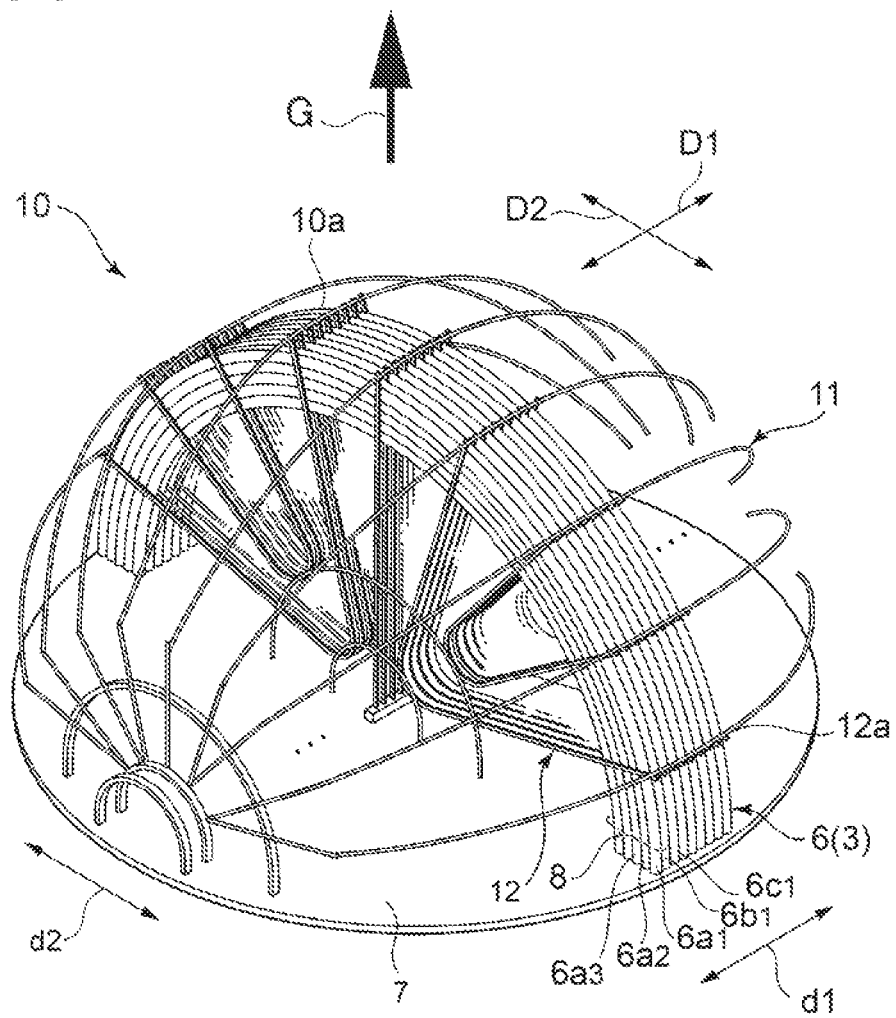
FIG. 1 is a perspective view of a U-bent portion of a heat-transfer tube bundle according to an embodiment.
Figure 2:
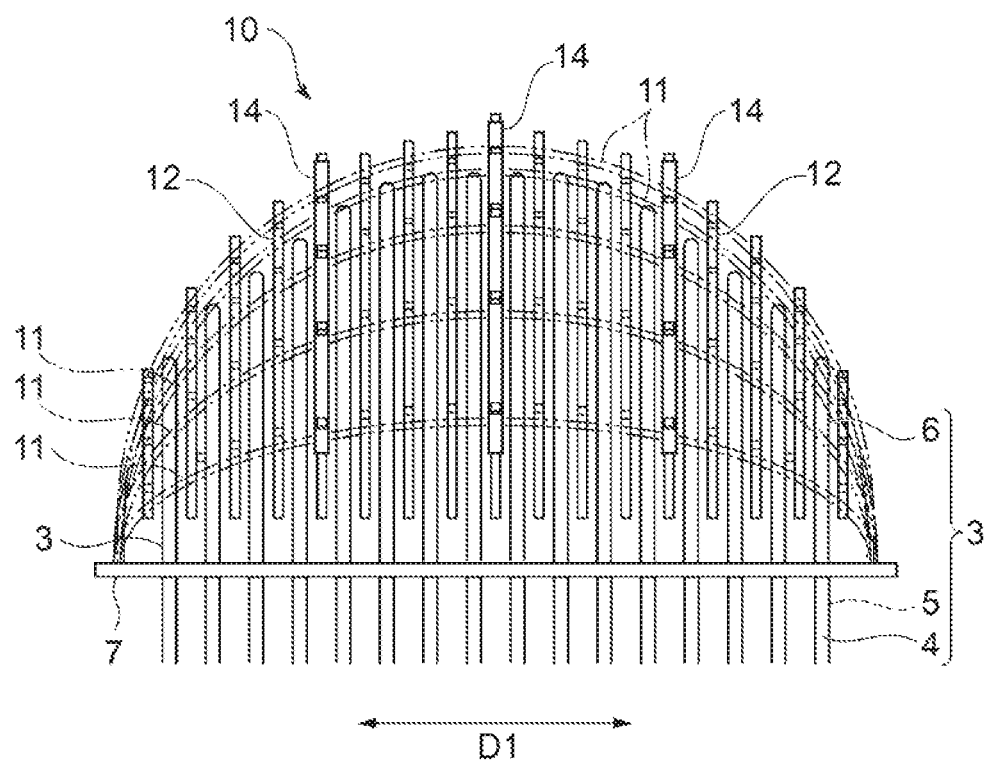
FIG. 2 is a diagram showing an example of a support structure by anti-vibration members viewed from an in-plane direction.
Figure 3:
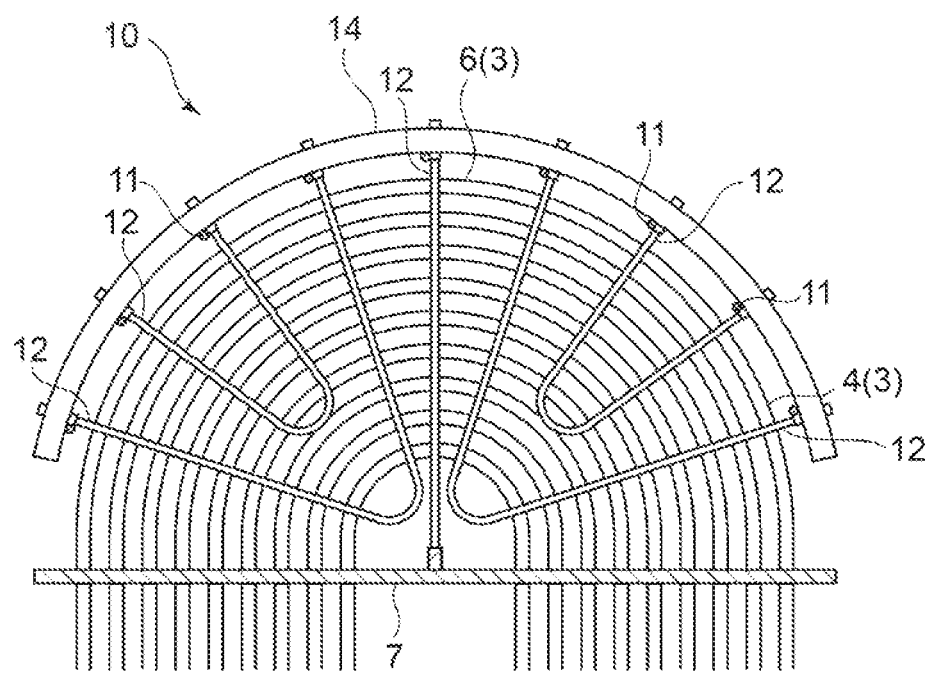
FIG. 3 is a diagram showing an example of a support structure by anti-vibration members viewed from an out-of-plane direction.

FIG. 1 is a perspective view of a U-bent portion 10a of a heat-transfer tube bundle 10 according to an embodiment. FIG. 2 is a side view of the heat-transfer tube bundle 10 viewed from an in-plane direction D2 in FIG. 1 (array direction d2 in FIG. 1). FIG. 3 is a side view of the heat-transfer tube bundle 10 viewed from an out-of-plane direction D1 in FIG. 1 (array direction d1 in FIG. 1). In FIG. 1, some components are omitted for clarity. The components omitted in FIG. 1 are illustrated in FIGS. 2 and 3, which are side views of the heat-transfer tube bundle 10 in FIG. 1.

In some embodiments, the heat-transfer tube bundle 10 includes a plurality of heat-transfer tubes 3 and a tube support plate 7 into which the plurality of heat-transfer tubes 3 are inserted. The heat-transfer tube bundle 10 is configured to generate steam by heat exchange with a fluid flowing through the plurality of heat-transfer tubes 3. Each of the heat-transfer tubes 3 has a first straight tube part 4 positioned on a fluid inlet side, a second straight tube part 5 positioned on a fluid outlet side, and a bent part 6 positioned between the first straight tube part 4 and the second straight tube part 5. The tube support plate 7 is provided with a plurality of through holes into which the first straight tube part 4 and the second straight tube part 5 are inserted. The through holes disposed in the tube support plate 7 for inserting the first straight tube part 4 and the second straight tube part 5 will be described in detail with reference to FIG. 13.

The heat-transfer tube bundle 10 is composed of a plurality of heat-transfer tubes 3 each having a U-shaped bent part 6. The bent parts 6 of the plurality of heat-transfer tubes 3 form a U-bent portion 10a. In the structure shown in FIG. 1, the heat-transfer tubes 3 are concentrically arranged around a common curvature center in the same plane (along the in-plane direction D2) so that a heat-transfer tube 3 having a bent part 6 with a larger curvature radius is positioned at an outer portion (upper portion in FIG. 1) in a radial direction of the bent part 6 (tube array 8 in FIG. 1). FIG. 3 shows that a plurality of tube arrays 8, each including the heat-transfer tubes 3 arranged along the in-plane direction D2, are located in row. These tube arrays 8 are arranged in a direction (out-of-plane direction D1 in FIG. 1) perpendicular to the plane containing the bent parts 6.

As shown in FIGS. 1 and 3, the curvature radius of the bent part 6 of the heat-transfer tube 3 positioned on the outermost peripheral side in each of the tube arrays 8 varies with the position of the corresponding tube array 8 in the out-of-plane direction D1. In this way, a semi-spherical U-bent portion 10a is formed at an upper end of the heat-transfer tube bundle 10 by changing the curvature radius of the bent part 6 and stacking the plurality of tube arrays 8 in the out-of-plane direction D1. As a result, as shown in FIG. 1, a plurality of bent parts $6a_1$, $6a_2$, $6a_3$ ... with different curvature radii are arranged along the in-plane direction D2, and a plurality of bent parts $6a_1$, $6b_1$, $6c_1$ ... with the same curvature radius are arranged along the out-of-plane direction D1.

While the present embodiment shows a case where the heat-transfer tubes 3 constituting the heat-transfer tube bundle 10 are arranged in square, the technical ideas of the present application can also be applied to a case where the bent parts are arranged in another way, for instance, by triangle arrangement in which the bent parts with the same curvature radius are arranged in every other row.

In the heat-transfer tube bundle 10, an anti-vibration member 12 is inserted between bent parts 6 of adjacent heat-transfer tubes 3 in the out-of-plane direction D1 perpendicular to the plane containing the bent parts 6 to restrict movement of the plurality of heat-transfer tubes 3 (bent parts 6) in the out-of-plane direction D1. For instance, in FIG. 1, a plurality of anti-vibration members 12 are inserted along the in-plane direction D2 on both sides of each of the tube arrays 8 arranged in the out-of-plane direction D1 so as to restrict movement of the bent parts 6 of the plurality of heat-transfer tubes 3 belonging to the corresponding tube array 8 in the out-of-plane direction D1.

As shown in FIG. 1, a first retention member 11 is an arc-shaped rod member mounted along the outer circumference of the U-bent portion 10a, i.e., the outer circumference of the semi-spherical U-bent portion 10a. The anti-vibration members 12 extend inward in a radial direction of the semi-spherical U-bent portion 10a from the first retention member 11. To end parts 12a of the anti-vibration members 12, as shown in FIG. 1, the first retention member 11 is welded to connect the end parts 12a of the plurality of anti-vibration members 12. The first retention member 11 is perpendicular to the tube arrays 8, in which the heat-transfer tubes 3 are stacked along the in-plane direction D2, and extends along the semi-spherical surface of the U-bent portion 10a.

As shown in FIGS. 2 and 3, a plurality of first retention members 11 may be connected by a second retention member (bridge) 14. The second retention member 14 is an arc-shaped plate member disposed along the outer circumference of the U-bent portion 10a, i.e., the outer circumference of the semi-spherical U-bent portion 10a. The second retention member 14 extends along a direction of extending the bent parts 6 of the heat-transfer tubes 3 in the U-bent portion 10a. A plurality of second retention members 14 may be arranged in the out-of-plane direction D1.

In the heat-transfer tube bundle 10, the anti-vibration members 12 inserted between the bent parts 6 of the adjacent heat-transfer tubes 3 in the out-of-plane direction restrict movement of the plurality of heat-transfer tubes 3 (bent parts 6) in the out-of-plane direction D1. Thus, when an exciting force is applied in the out-of-plane direction D1, only a section of the bent part 6 of each heat-transfer tube 3 between two adjacent anti-vibration members 12 vibrates. However, a series of the heat-transfer tubes 3 (tube array 8 in FIG. 1) arranged in the in-plane direction D2 along the plane containing the bent parts 6 is not connected to the anti-vibration members 12 on both sides. The restriction is based on only fiction with the anti-vibration members 12 on both sides. As a result, the direction in which each heat-transfer tube 3 vibrates is substantially coincident with the in-plane direction D2, and a contact load caused by collision between the heat-transfer tube 3 and the adjacent anti-vibration member 12 is mostly derived from friction in the in-plane direction D2.

In an illustrative embodiment, the heat-transfer tube bundle 10 described with reference to FIGS. 1 to 3 may be a heat-transfer tube bundle of a steam generator for heat exchange between primary cooling water and secondary cooling water in a pressurized water reactor (PWR) type nuclear power generating plant. In this case, the secondary cooling water flows from just below the U-bent portion 10a to just above the U-bent portion 10a along a flow direction G perpendicular to the out-of-plane direction D1 and the in-plane direction D2 shown in FIG. 1, thereby performing heat exchange with the primary cooling water flowing through the heat-transfer tubes 3. Thus, the flow of the secondary cooling water is cross-flow perpendicular to the bent parts 6 of the heat-transfer tubes 3 at the uppermost part of the U-bent portion 10a. From the above, the vibration damping structure analysis method according to some embodiments of the present invention may be performed to previously evaluate whether a sufficient damping force for suppressing self-excited vibration of the heat-transfer tube bundle 10 is achieved in the heat-transfer tube bundle 10 when the flow of the secondary cooling water along the flow direction G in FIG. 1 acts as an excitation force.

As described above, in a case where the heat-transfer tube bundle 10 constitutes a steam generator provided in a pressurized water reactor, the heat-transfer tubes 3, through which primary cooling water supplied from the reactor flows, are arranged in parallel to form the heat-transfer tube bundle 10, and secondary cooling water flows over an outer surface of a heat transfer portion of the beat-transfer tube bundle 10 to perform heat exchange. In this steam generator, the heat-transfer tubes need to be arranged densely to improve the efficiency of heat exchange. In this case, a gap between the heat-transfer tubes for the secondary cooling water becomes small, and consequently, the flow rate of the secondary cooling water can increase. If the flow rate exceeds a certain limit flow rate, self-excited vibration can occur in the heat-transfer tube bundle 10. This self-excited vibration is an unstable structural behavior in which movement of the heat-transfer tube bundle 10 and fluid flow are mutually affected. Its vibration amplitude increases over time and leads to damage to the heat-transfer tube bundle 10. Thus, self-excited vibration is a large problem.

In order to prevent self-excited vibration of the heat-transfer tube bundle in the steam generator, the plurality of heat-transfer tubes 3, whose lower end is supported by the tube support plate 7, are supported by inserting the plurality of anti-vibration members 12 at the U-bent portion 10a at the upper portion. That is, at the U-bent portion 10a of the steam generator, the tube arrays 8, composed of the plurality of heat-transfer tubes 3 arranged along the same plane, are supported by the anti-vibration members 12 inserted therebetween. In this case, a contact load which acts between the anti-vibration member 12 and the bent part 6 of the heat-transfer tube 3 serves as a damping force to reduce energy of self-excited vibration caused by a fluid force of the secondary cooling water, and it is beneficial to previously evaluate whether a sufficient damping force for suppressing self-excited vibration is achieved in the heat-transfer tube bundle 10. For instance, if interference exists between the anti-vibration member 12 and the bent part 6 of the heat-transfer tube 3 in a state where the heat-transfer tube bundle 10 shown in FIG. 1 is assembled, a bending load or a compression load occurs in the anti-vibration member 12 and the bent part 6 in accordance with the interference. By this load, the bent part 6 receives a contact force from the anti-vibration member 12. Accordingly, it is beneficial to previously evaluate whether the contact force applied between the anti-vibration member 12 and the bent part 6 is necessary and sufficient for suppressing self-excited vibration of the heat-transfer tube bundle 10 in a state where the heat-transfer tube bundle 10 is assembled.

In some embodiments described below, evaluation of the damping force is mainly performed with respect to the bent part 6 of each beat-transfer tube 3 constituting the U-bent portion 10a of the heat-transfer tube bundle 10. Accordingly, in some embodiments below, the U-bent portion 10a of the heat-transfer tube bundle 10 is simply referred to as the heat-transfer tube bundle 10, and the bent part 6 of each heat-transfer tube 3 is simply referred to as the heat-transfer tube 6 or the tube 6.

Figure 4A:
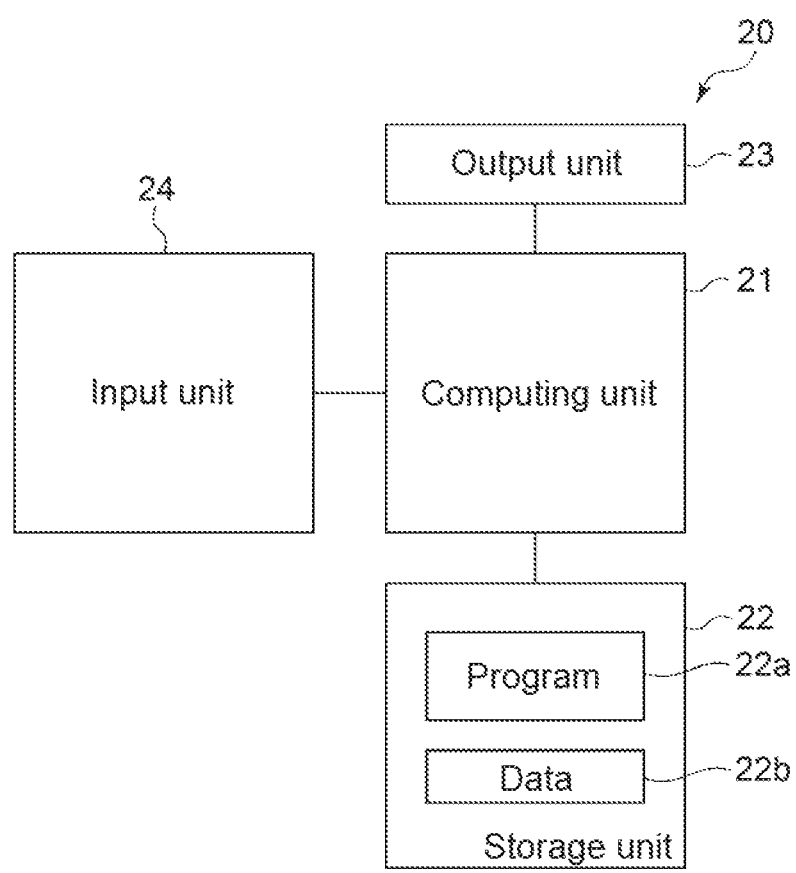
FIG. 4A is a diagram showing a computer device for performing a structural analysis method according to an embodiment.

Next, the vibration damping structure analysis method according to some embodiments of the present invention and a computer device for performing the vibration damping structure analysis method will be described with reference to FIGS. 4 to 6. FIG. 4A is a diagram showing an overall configuration of a computer device 20 for implementing the vibration damping structure analysis method according to some embodiments. The computer device 20 includes a computing unit 21, a storage unit 22, an output unit 23, and an input unit 24. In an illustrative embodiment, the computing unit 21 may be configured as an arithmetic circuit which reads and executes a program 22a stored in the storage unit 22 to perform the vibration damping structure analysis method for evaluating self-excited vibration of the heat-transfer tube bundle 10 disposed in a fluid and supported by the anti-vibration member 12. In this embodiment, data which needs to be read and written by the computing unit 21 for performing the vibration damping structure analysis method may be stored as data 22b in the storage unit 22.

The output unit 23 is an output device for presenting a part of computing results of the computing unit 21 or the data 22b stored in the storage unit 22 to a user. In an illustrative embodiment, the output unit 23 may include display means such as a display device as output means. The input unit 24 is an input device for inputting external data representative of various information and parameters into the computing unit 21 by operation of the user. In an illustrative embodiment, the input unit 24 may include input means such as a keyboard or a mouse.

Figure 4B:
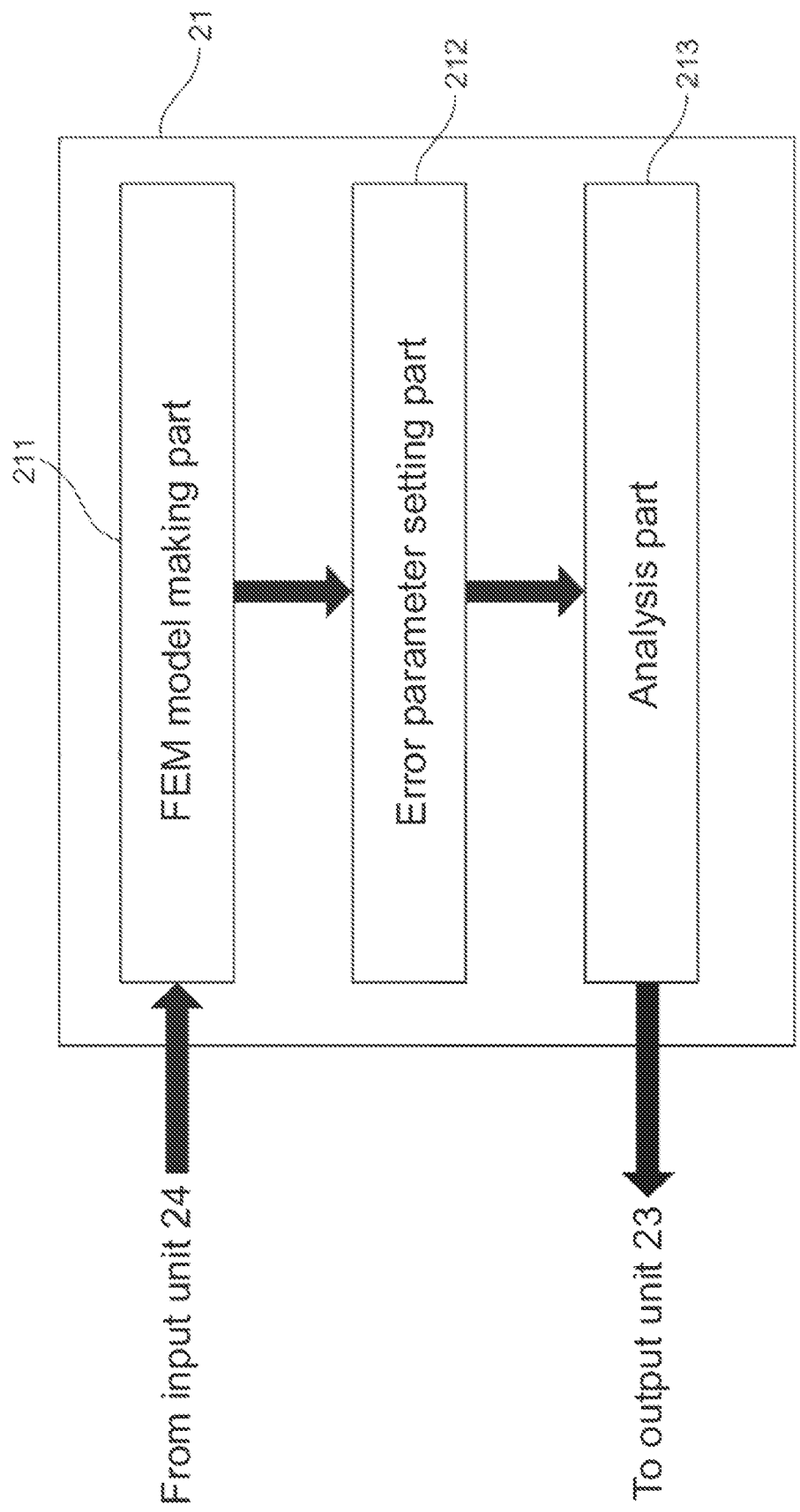
FIG. 4B is a diagram showing an internal configuration of a computing unit of the computer device depicted in FIG. 4A.

FIG. 4B is a diagram showing an internal configuration of the computing unit 21 included in the computer device 20. With reference to FIG. 4B, the computing unit 21 includes a FEM model making part 211, an error parameter setting part 212, and an analysis part 213. In an example, the computing unit 21 may be implemented by a general purpose processor. In this case, the FEM model making part 211, the error parameter setting part 212, and the analysis part 213 may be implemented as program modules generated in the computing unit 21 when the computing unit 21 reads the program 22a from the storage unit 22.

The FEM model making part 211 makes a FEM model corresponding to the vibration damping structure of the heat-transfer tube bundle 10. The error parameter setting part 212 sets an error parameter for a parameter relating to an element included in the FEM model made by the FEM model making part 211. The analysis part 213 performs structural analysis by the finite-element method using the FEM model with the error parameter set by the error parameter setting part 212. Detailed operation performed by the FEM model making part 211, the error parameter setting part 212, and the analysis part 213 will now be described in accordance with the flowchart shown in FIG. 5.

Figure 5:
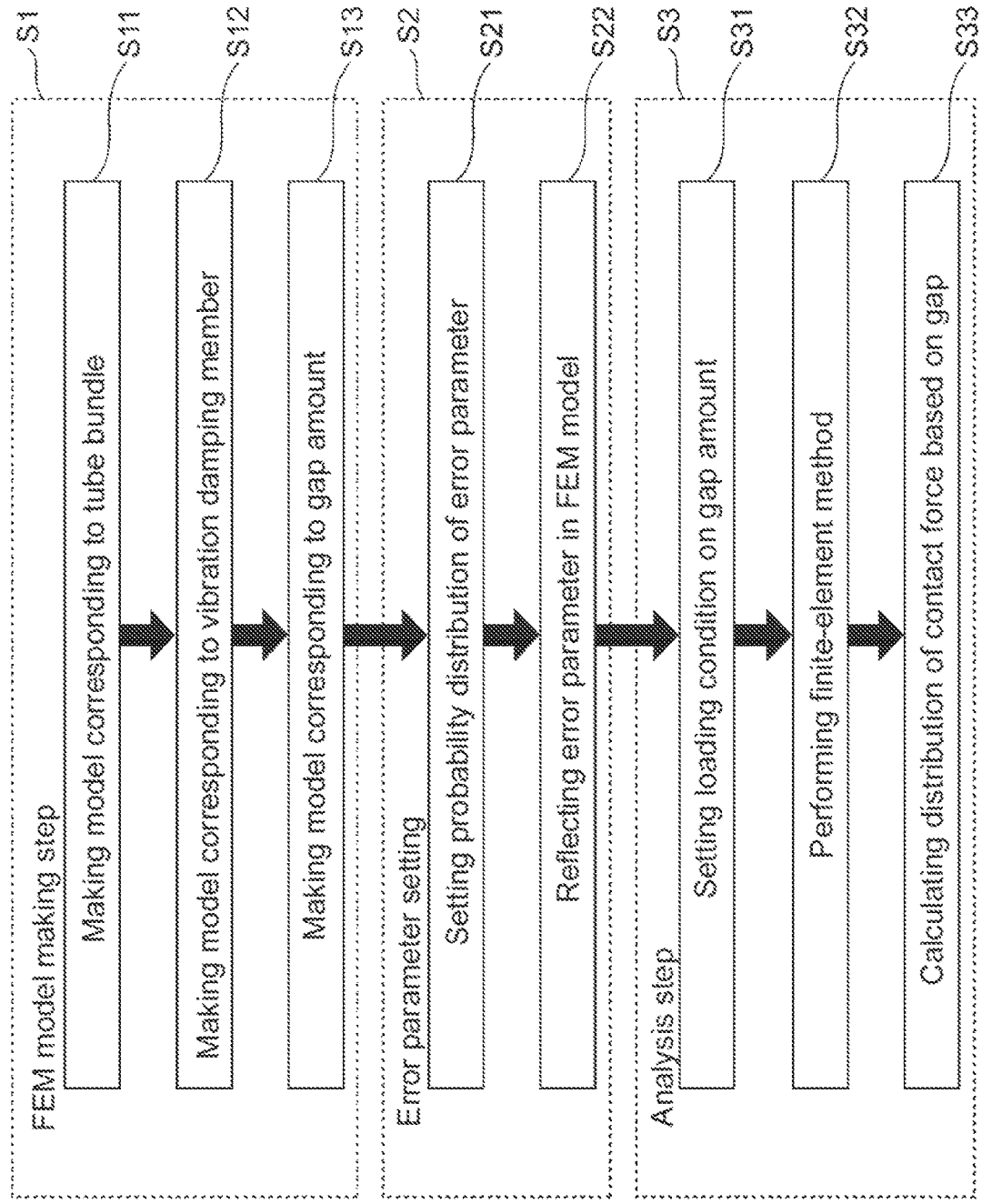
FIG. 5 is a flowchart of an execution procedure of a structural analysis method according to an embodiment.

The flowchart shown in FIG. 5 starts with step S1. In step S1 of FIG. 5, the FEM model making part 211 makes a FEM model corresponding to the vibration damping structure of the heat-transfer tube bundle 10. More specifically, contact surfaces between each of the heat-transfer tubes 6 and each of the anti-vibration members 12 are modeled by using contact elements of partial contact including the amount of a gap (gap amount) between each of the heat-transfer tubes 6 and each of the anti-vibration members 12. For example, in an illustrative embodiment shown in FIG. 6, in step S11, the FEM model making part 211 may make the FEM model so as to include a first element 53 corresponding to each of the heat-transfer tubes 6 constituting the heat-transfer tube bundle 10. Further, in step S12, the FEM model making part 211 may make the FEM model so as to include a second element 50 including a one-dimensional element corresponding to the anti-vibration member 12. Further, in step S13, the FEM model making part 211 may make the FEM model so as to include a third element 62 corresponding to a gap amount (the amount of a gap) between the heat-transfer tube 6 and the anti-vibration member 12.

Figure 6:
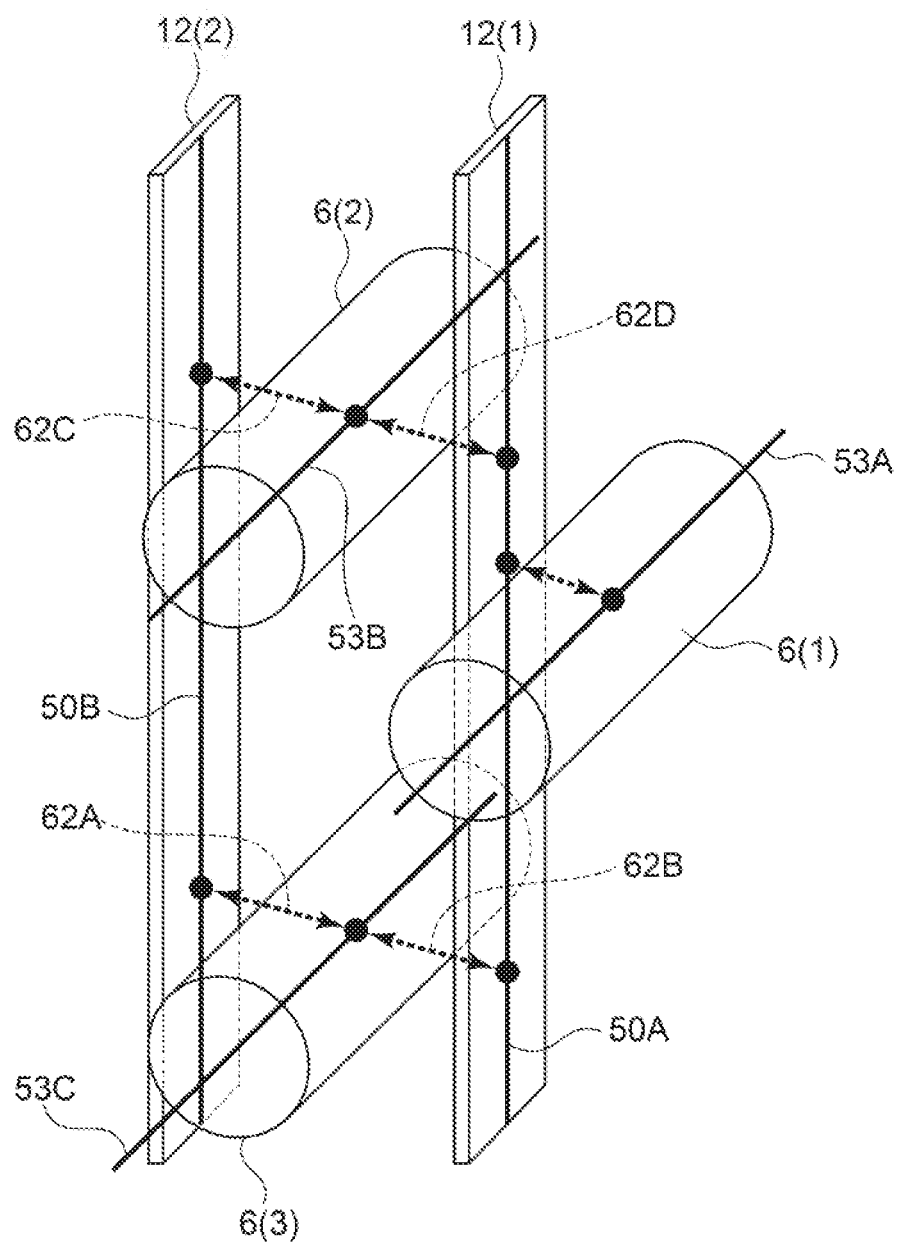
FIG. 6 is a diagram showing a vibration damping structure in which a heat-transfer tube is supported by friction between two anti-vibration members, using one-dimensional elements and gap elements.

As shown in FIG. 6, the first element 53 may include a plurality of first one-dimensional elements 53A to 53C extending to respectively correspond to the heat-transfer tubes 6(1) to 6(3) included in the heat-transfer tube bundle 10. More specifically, the first one-dimensional elements 53A to 53C may be modeled as one-dimensional elements each passing through the center of a circular cross-section of a corresponding one of the heat-transfer tubes 6(1) to 6(3) and extending along a length direction of the corresponding one of the heat-transfer tubes 6(1) to 6(3). Further, as shown in FIG. 6, the second element 50 may include second one-dimensional elements 50A and 50B extending to correspond to the anti-vibration members 12(1) and 12(2). More specifically, the second one-dimensional elements 50A and 50B may be modeled as one-dimensional elements each passing through a central portion with respect to a width direction of a corresponding one of the anti-vibration members 12(1) and 12(2) and extending along a length direction of the corresponding one of the anti-vibration members 12(1) and 12(2).

Further, as shown in FIG. 6, the third element 62 may include gap elements 62A to 62D each representing the shortest distance between the second one-dimensional element 50A, 50B and the first one-dimensional element 53B, 53C. In this regard. FIG. 6 shows four gap elements 62A to 62D corresponding to four gaps between the first one-dimensional elements 53B, 53C and the second one-dimensional elements 50A, 50B. More specifically, the gap elements 62A to 62D are defined as follows.

In the example shown in FIG. 6, the second one-dimensional element 50 (50A and 50B) and the first one-dimensional element 53 (53B and 53C) extend in perpendicular directions. Here, consider a case where the second one-dimensional element 50 (50A and 50B) and the first one-dimensional element 53 (53B and 53C) are viewed from a direction perpendicular to the contact surface between the heat-transfer tube 6 (6(1) to 6(3)) and the anti-vibration member 12 (12(1), 12(2)). In this case, a distance between the second one-dimensional element 50 (50A and 50B) and the first one-dimensional element 53 (53B and 53C) is shortest at an intersection between the second one-dimensional element 50 (50A and 50B) and the first one-dimensional element 53 (53B and 53C). Then, as shown in FIG. 6, this shortest distance between the second one-dimensional element (50A and 50B) and the first one-dimensional element (53B and 53C) is modeled as the gap element 62A to 62D. In brief, the gap element 62A to 62D is a model of the gap amount between each of the heat-transfer tubes 6 and each of the anti-vibration members 12.

Figure 7:
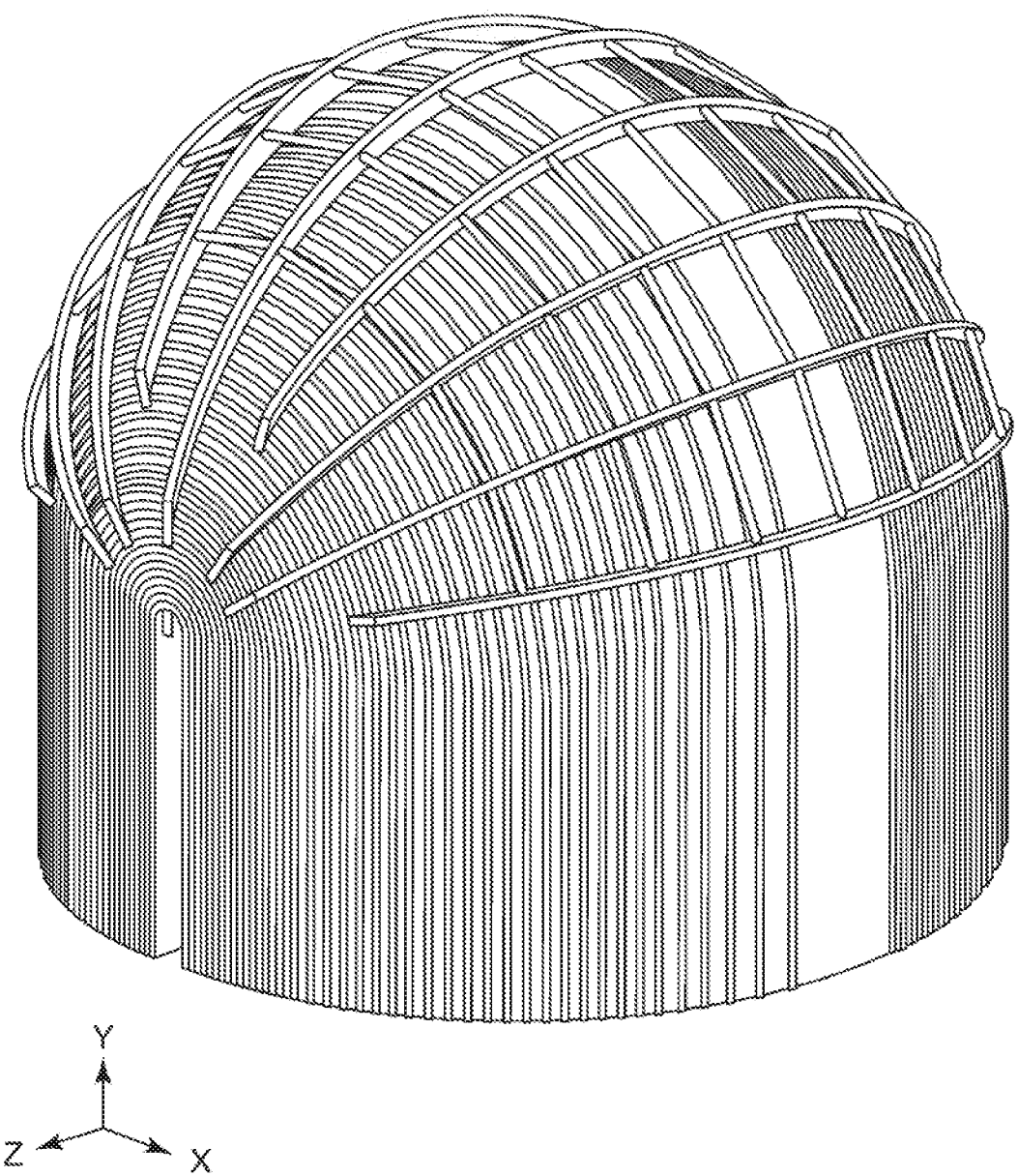
FIG. 7 is a diagram visually showing an image when the entire heat-transfer tube bundle having a U-bent portion shown in FIG. 1 is modeled by the finite-element method.

As described above, all of the heat-transfer tubes 6 and the anti-vibration members 12 constituting the heat-transfer tube bundle 10 are modeled as the one-dimensional elements 53 and 50, and further, all of the gap amounts separating the heat-transfer tubes 6 and the anti-vibration members 12 in the heat-transfer tube bundle 10 are modeled as the gap elements 62. As a result, an image which visually represents the whole structure of the heat-transfer tube bundle 10 by the FEM model is obtained as shown in FIG. 7.

Figure 8:
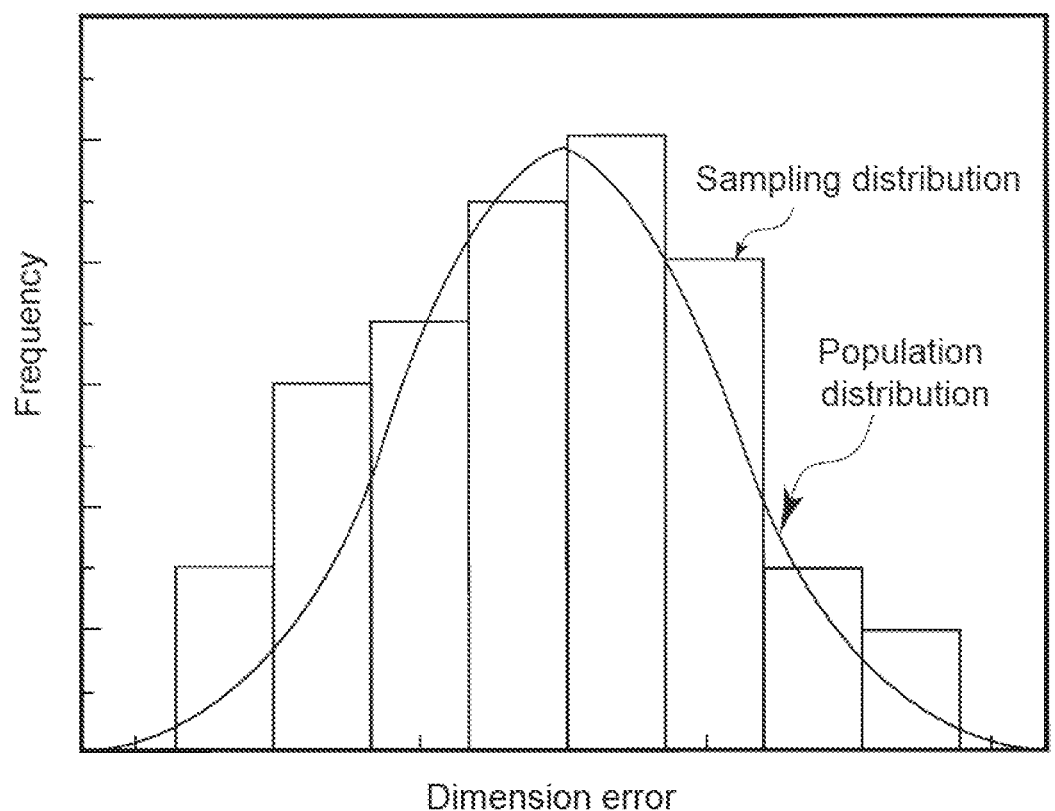
FIG. 8 is a diagram showing an example of a manufacturing tolerance distribution.

Then, the flowchart shown in FIG. 5 proceeds to step S2, and the error parameter setting part 212 sets an error parameter ε for a parameter relating to an element included in the FEM model made by the FEM model making part 211. More specifically, first, in step S21, the error parameter setting part 212 sets a probability distribution of the error parameter ε as shown in FIG. 8, based on a manufacturing tolerance distribution of each of the heat-transfer tubes 6 and each of the anti-vibration members 12. In an example, the error parameter ε may include a random number distributed in accordance with the probability distribution determined based on the manufacturing tolerance distribution. In an alternative embodiment, the error parameter may be set based on data measured on the vibration damping structure of the heat-transfer tube bundle 10.

Then, in step S22, a tolerance is provided to the FEM model, in which the amount of a gap between each of the heat-transfer tubes 6 and each of the anti-vibration members 12 is modeled, so that the error parameter ε distributed in accordance with the probability distribution as shown in FIG. 8 is reflected. For instance, in the example shown in FIG. 6, a tolerance is provided to the gap elements 62A to 62D so as to reflect the error parameter ε distributed in accordance with the manufacturing tolerance distribution. In the example shown in FIG. 6, the gap elements 62A to 62D are FEM models corresponding to the shortest distances between the first one-dimensional elements 53A to 53C corresponding to the heat-transfer tubes 6(1) to 6(3) and the second one-dimensional elements 50A and 50B corresponding to the anti-vibration members 12(1) and 12(2).

In an illustrative embodiment, as shown in FIGS. 9A to 9D, the error parameter s may be based on a manufacturing tolerance caused by at least one of the outer diameter, the plate thickness, and warpage of the heat-transfer tubes 6 included in the heat-transfer tube bundle 10, and the plate thickness and warpage of the anti-vibration members 12. That is, the error parameter corresponds to one or more of variation in thickness of the anti-vibration member 12 perpendicular to the contact surface with the heat-transfer tube 6, deviation from flatness of the anti-vibration member 12 caused by strain of the contact surface, variation in outer diameter in the cross-sectional shape of the heat-transfer tube 6, and deviation from the designed profile along the length direction of the heat-transfer tube 6 caused by waviness of the heat-transfer tube 6 in the length direction, due to manufacturing tolerances of the heat-transfer tubes 6 and the anti-vibration members 12. FIGS. 9A to 9D depict manufacturing tolerances regarding the outer diameter, the plate thickness, and warpage of the heat-transfer tubes 6 included in the heat-transfer tube bundle 10, and the plate thickness and warpage of the anti-vibration members 12.

The manufacturing tolerances described herein are for illustrative purpose only, and the error parameter ε may be set for other types of manufacturing tolerances, based on the same spirit.

Figure 9A:
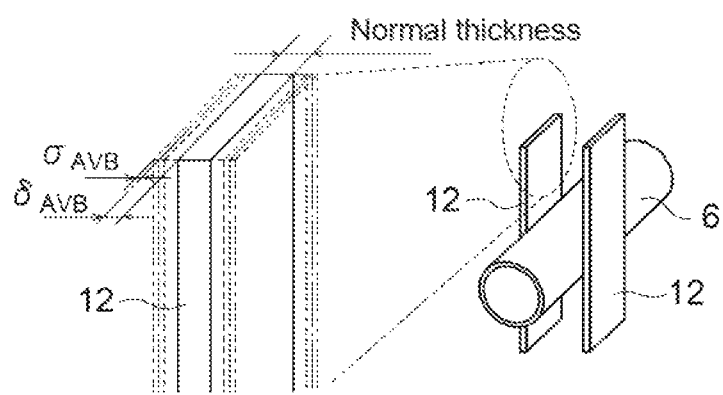
FIG. 9A is a diagram showing an example of various types of manufacturing tolerances caused when a heat-transfer tube and an anti-vibration member are manufactured.

For instance, when the thickness is defined as the dimension of the anti-vibration member 12 along a direction perpendicular to the contact surface between the anti-vibration member 12 and the heat-transfer tube 6, FIG. 9A shows an error added to the normal thickness, which is a designed dimension relating to the thickness of the anti-vibration member 12 due to the manufacturing tolerances. Accordingly, if the actual thickness of the anti-vibration member 12 is larger than the designed dimension due to the manufacturing tolerances, the amount of the gap between the anti-vibration member 12 and the heat-transfer tube 6 is smaller than the designed dimension. Conversely, if the actual thickness of the anti-vibration member 12 is smaller than the designed dimension due to the manufacturing tolerances, the amount of the gap between the anti-vibration member 12 and the heat-transfer tube 6 is larger than the designed dimension.

Figure 9B:
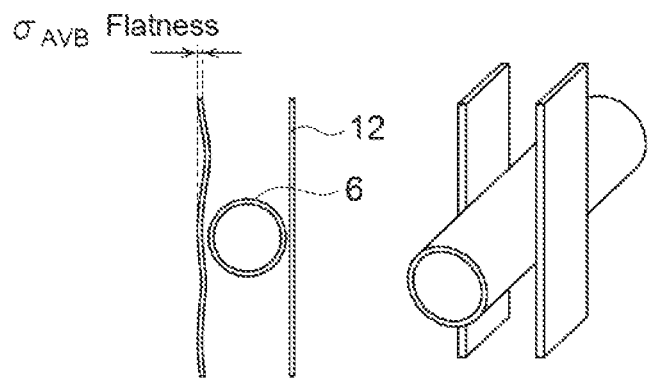
FIG. 9B is a diagram showing another example of various types of manufacturing tolerances caused when a heat-transfer tube and an anti-vibration member are manufactured.

FIG. 9B shows an error corresponding to the amount of deviation (warpage amount) from flatness of the anti-vibration member 12, due to the manufacturing tolerances, caused by warpage in the thickness direction of the anti-vibration member 12 designed to be flat in the thickness direction. Accordingly, when the anti-vibration member 12 is not flat in the thickness direction due to the manufacturing tolerances, the amount of the gap between the anti-vibration member 12 and the heat-transfer tube 6 is larger or smaller than the designed dimension in accordance with the warpage amount in the thickness direction of the anti-vibration member 12.

Figure 9C:
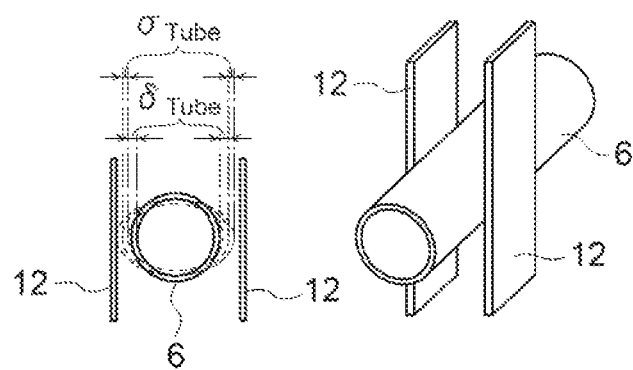
FIG. 9C is a diagram showing another example of various types of manufacturing tolerances caused when a heat-transfer tube and an anti-vibration member are manufactured.

FIG. 9C shows an error caused by an irregular outer diameter of the heat-transfer tube 6 designed to have a circular cross-section and disposed between two anti-vibration members 12, due to the manufacturing tolerances. That is, the outer diameter of the heat-transfer tube 6 designed to have a circular cross-section should be uniform over the entire circumference of the heat-transfer tube 6. However, in practice, the heat-transfer tube 6 includes a phase portion having a relatively large outer diameter and a phase portion having a relatively small outer diameter due to the manufacturing tolerances; thus, the heat-transfer tube 6 has an elliptical cross-section. For instance, as shown in FIG. 9C, in the heat-transfer tube 6, the outer diameter in a direction perpendicular to the contact surface with the anti-vibration member 12 can be larger than the inner diameter in a direction parallel to the contact surface. As a result, the amount of the gap between the anti-vibration member 12 and the heat-transfer tube 6 is smaller than the designed dimension.

Figure 9D:
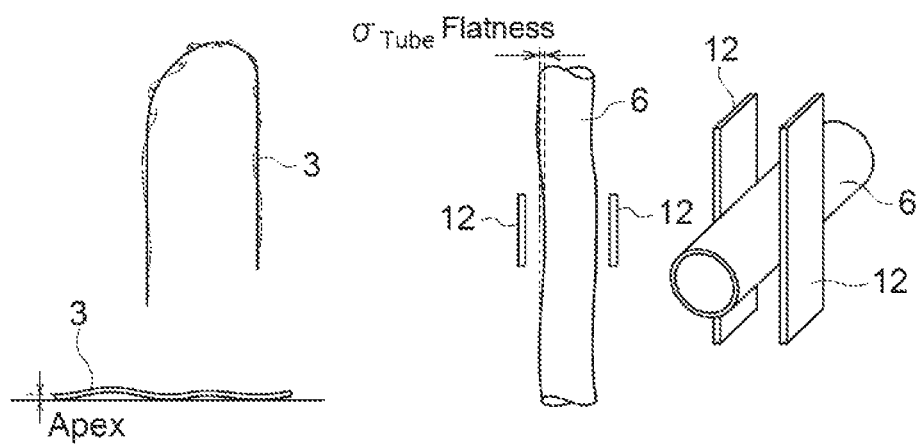
FIG. 9D is a diagram showing another example of various types of manufacturing tolerances caused when a heat-transfer tube and an anti-vibration member are manufactured.

FIG. 9D shows a state where the shape of the heat-transfer tube 6 in the length direction is deviated from the designed profile along the length direction of the heat-transfer tube 6 due to waviness of the heat-transfer tube 6 in the length direction. When the deviation of the shape in the length direction of the heat-transfer tube 6 acts as an error for the amount of the gap between the heat-transfer tube 6 and the anti-vibration member 12, the amount of the gap between the heat-transfer tube 6 and the anti-vibration member 12 becomes larger or smaller than the designed dimension. As described above, the error parameter setting part 212 provides a tolerance to the FEM model which represents the amount of the gap between each of the heat-transfer tubes 6 and each of the anti-vibration members 12 so that the error parameter ε as illustrated in FIGS. 9A to 9D is reflected.

Then, the flowchart shown in FIG. 5 proceeds to step S3, and the analysis part 213 performs structural analysis by the finite-element method using the FEM model (first one-dimensional element 53, second one-dimensional element 50, and gap element 62) with the error parameter set by the error parameter setting part 212. In step S31 shown in FIG. 5, the analysis part 213 sets a later-described loading condition for the gap amount represented by the gap element 62A to 62D shown in FIG. 6. For instance, in the example shown in FIG. 6, the loading condition is set so that, when the gap amount represented by the gap element 62A to 62D is less than a predetermined value, a contact force applied to the first one-dimensional element 53 from the second one-dimensional element 50 increases with an increase in interference. The gap amount represented by the gap element 62A to 62D is an amount whose initial value between the heat-transfer tube 6 and the anti-vibration member 12 at the time of designing the dimension is represented, for instance, by zero and which decreases as a side edge of the heat-transfer tube 6 facing the contact surface with the anti-vibration member 12 approximates to the contact surface of the anti-vibration member 12.

The initial gap amount may be not zero. For instance, the initial gap amount may be set to have a positive value.

Figure 10:
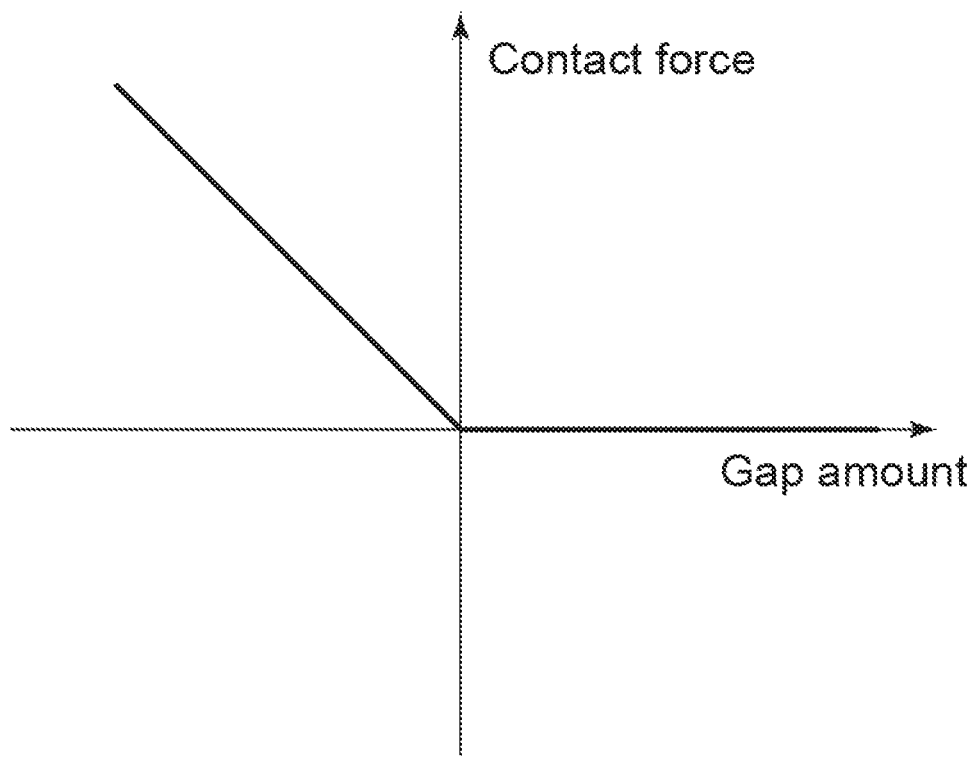
FIG. 10 is a graph showing that a contact force acting between one-dimensional elements increases in accordance with gap amount.

That is, the loading condition imposed on the gap element 62A to 62D causes the contact force applied to the first one-dimensional element 53 (53A to 53C) from the second one-dimensional element 50 (50A, 50B) to change with an increase in interference represented by the gap elements 62A to 62D, as shown by a bold line in FIG. 10. With reference to FIG. 10, under this loading condition, as long as the gap amount exists between the first one-dimensional element 53 and the second one-dimensional element 50, i.e., a physical gap amount exists between the heat-transfer tube 6 and the anti-vibration member 12, the contact force applied to the first one-dimensional element 53 from the second one-dimensional element 50 is left zero. However, when the gap amount between the first one-dimensional element 53 and the second one-dimensional element 50 negatively increases, and the heat-transfer tube 6 physically interferes with the anti-vibration member 12, the contact force increases with the increase in gap amount in proportion to the physical interference.

When the contact force increases with the increase in gap amount in proportion to the physical interference, the slope of the straight line of FIG. 10 corresponding to the proportionality constant is modeled by a spring constant K. That is, assuming that the gap amount is displacement amount applied to a spring by an external force in proportion to the physical interference, the contact force is equivalent to a spring load obtained by multiplying this displacement amount by the spring constant K. In this way, the above-described loading condition is set for the four gap elements 62A to 62D corresponding to the four gaps between the first one-dimensional elements 53B, 53C and the second one-dimensional elements 50A, 50B.

Then, significance of providing the loading condition described with reference to FIG. 10 to the FEM model of the heat-transfer tube bundle 10 will be described. The loading condition allows the FEM model to reflect the following physical interaction between the heat-transfer tube 6 represented by the first one-dimensional element 53 and the anti-vibration member 12 represented by the second one-dimensional element 50. When the interference corresponding to the gap element 62 exceeds the physical gap amount between the heat-transfer tube 6 and the anti-vibration member 12, the exceedance corresponds to the interference between the heat-transfer tube 6 and the anti-vibration member 12. As a result, a compression load or a bending load occurs in the heat-transfer tube 6 and the anti-vibration member 12(2) in accordance with the interference between the heat-transfer tube 6 and the anti-vibration member 12(2). The compression load or the bending load which occurs in the heat-transfer tube 6 and the anti-vibration member 12(2) causes a contact load between the heat-transfer tube 6 and the anti-vibration member 12 and suppresses vibration caused in the heat-transfer tube bundle 10 due to the flow of the fluid. As described above, once the analysis part 213 sets the loading condition for the gap amount corresponding to the gap element 62, the flowchart of FIG. 5 proceeds to step S32.

In step S32, a finite-element analysis is performed on the whole of the FEM model of the heat-transfer tube bundle 10 in which the error parameter c and the loading condition are set as described above. The significance of performing the finite-element analysis on the gap amount represented by the gap element 62 as the amount of the gap between the first one-dimensional element 53 and the second one-dimensional element 50 immediately after step S31 of FIG. 5 will be described. That is, the gap amount immediately after step S31 of FIG. 5 does not consider an interaction of the compression load or the bending load which acts between the plurality of anti-vibration members 12 and the plurality of heat-transfer tubes 6 constituting the heat-transfer tube bundle 10 over the whole heat-transfer tube bundle 10. Accordingly, the finite-element analysis is repeatedly performed until the compression load or the bending load which acts between the plurality of anti-vibration members 12 and the plurality of heat-transfer tubes 6 constituting the heat-transfer tube bundle 10 is converged to an equilibrium state over the whole heat-transfer tube bundle 10.

As described above, as a result of the finite-element analysis, it is possible to achieve a state where the compression load or the bending load which acts between the plurality of anti-vibration members 12 and the plurality of heat-transfer tubes 6 constituting the heat-transfer tube bundle 10 is in equilibrium over the whole heat-transfer tube bundle 10. Then, the analysis part 213 can estimate the contact force applied to the heat-transfer tube 6 from the anti-vibration member 12 in the equilibrium state in a numerical analysis manner. In this way, once the analysis part 213 completes the finite-element analysis, the flowchart of FIG. 5 proceeds to step S33, and the analysis part 213 calculates a distribution of the contact force applied to the heat-transfer tube 6 from the anti-vibration member 12, based on the gap amount between the first one-dimensional element 53 and the second one-dimensional element 50. As a result, the contact force acting between the plurality of anti-vibration members 12 and the plurality of heat-transfer tubes 6 constituting the heat-transfer tube bundle 10 is determined as a contact force distribution over the whole heat-transfer tube bundle 10. Thus, it is possible to evaluate the vibration damping property of the whole heat-transfer tube bundle 10 in a numerical analysis manner.

As described above, in the embodiment described with reference to FIGS. 4 to 10, the vibration damping structure to be analyzed is represented by the FEM model to perform structural analysis by the finite-element method. At this time, the error parameter ε is set for the parameter relating to the element included in the FEM model, which enables structural analysis with high precision, in consideration of an error factor of the vibration damping structure disposed in a fluid. Further, in this embodiment, the vibration damping structure to be analyzed is represented by the first to third elements. Since the FEM model corresponding to the vibration damping structure can be efficiently constructed by limited variable parameters, it is possible to perform structural analysis precisely with reduced computation load.

Further, in this embodiment, the first and the second elements are represented by one-dimensional elements while the third element is represented by a gap element disposed therebetween. Thereby, it is possible to construct a FEM model having a considerably simple structure. Such a FEM model efficiently reduces the variable parameters and thus has low computation load and is available for high-speed arithmetic processing. Further, in this embodiment, the gap amount set as an element (third element) of the FEM model corresponds to the amount of the gap between the heat-transfer tube 3 and the anti-vibration member 12 in an actual vibration damping structure. Thus, the loading condition is imposed so that, when the gap amount is less than a predetermined value, the contact force applied to the first one-dimensional element from the second one-dimensional element increases with an increase in interference, whereby it is possible to appropriately simulate the behavior of the contact force mutually acting on the heat-transfer tube 3 and the anti-vibration member 12 when they are in contact by computing analysis.

Further, in this embodiment, since the error parameter ε includes a random number, it is possible to randomize an error of the parameter for which the error parameter ε is to be set. Generally, errors of actual structural members are statistically uniform. Thus, setting the error parameter in this manner enables accurate reproduction of errors of an actual vibration damping structure and enables precise analysis. Further in this embodiment, the error parameter ε is set based on data measured on the vibration damping structure. Thus, even if an actual structure has statistically nonuniform errors due to some factors, appropriate analysis can be performed by setting the error parameter based on the measurement data.

In some embodiments, the error parameter ε may include at least one of the outer diameter, the plate thickness, and warpage of the heat-transfer tubes 3 included in the heat-transfer tube bundle 10, and the plate thickness and warpage of the anti-vibration members 12. In these embodiments, since the parameters which tend to affect analysis results in this type of vibration damping structure are set as the error parameter, it is possible to simulate the behavior of an actual structure more closely, and it is possible to perform analysis with high precision.

In an illustrative embodiment, as described later, focusing on the fact that, when the anti-vibration member 12 is viewed from a cross-sectional direction perpendicular to the longitudinal direction of the anti-vibration member 12, the anti-vibration member 12 has a twist amount (see FIG. 11B and FIG. 11C) with respect to an extension direction of the heat-transfer tube 6, the FEM model may be made in consideration of the twist amount. The twist amount (FIG. 11B and FIG. 11C) of the anti-vibration member 12 with respect to the extension direction of the heat-transfer tube 6 is caused by the manufacturing tolerance of the anti-vibration member 12, and the twist is one of manufacturing errors randomly distributed in accordance with the manufacturing tolerance distribution.

Figure 11A:
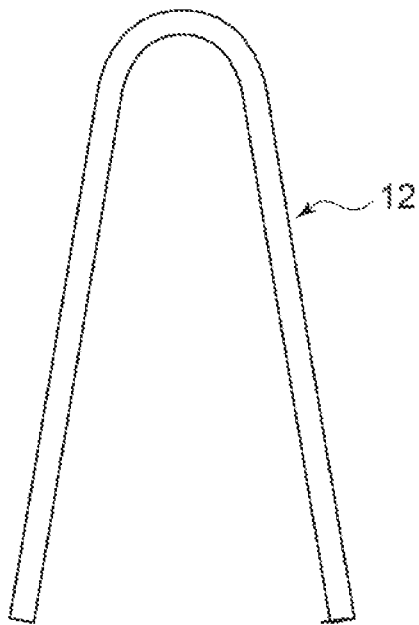
FIG. 11A is a diagram schematically showing an appearance of an anti-vibration member.
Figure 11B:
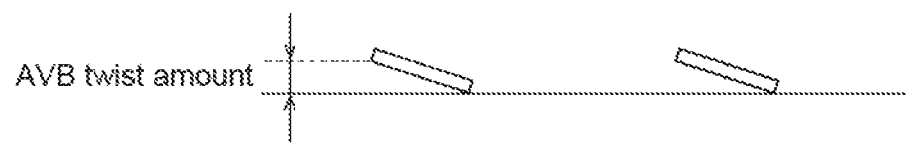
FIG. 11B is a diagram showing an example of twist amount in a thickness direction of the anti-vibration member of FIG. 11A.
Figure 11C:
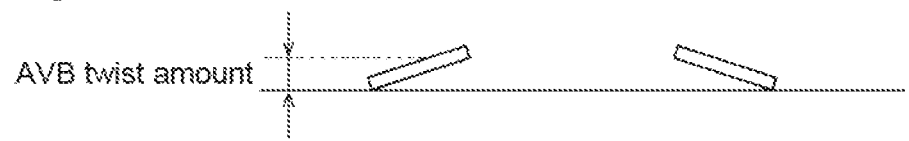
FIG. 11C is a diagram showing another example of twist amount in a thickness direction of the anti-vibration member of FIG. 11A.

That is, in the structure of an actual heat-transfer tube bundle 10, the contact surface, at which the anti-vibration member 12 is in contact with the heat-transfer tube 3, has a width along the length direction of each heat-transfer tube 6 and has a twist amount as illustrated in FIGS. 11B and 11C, with respect to the length direction of the heat-transfer tube as a reference. Accordingly, the width direction of the contact surface, at which the anti-vibration member 12 is in contact with the heat-transfer tube 3, has an angular offset with respect to the length direction of each heat-transfer tube 6. As a result, the contact surface of the anti-vibration member 12 having the twist amount abuts on the heat-transfer tube 6 only at one end in the width direction of the contact surface.

Figure 12:
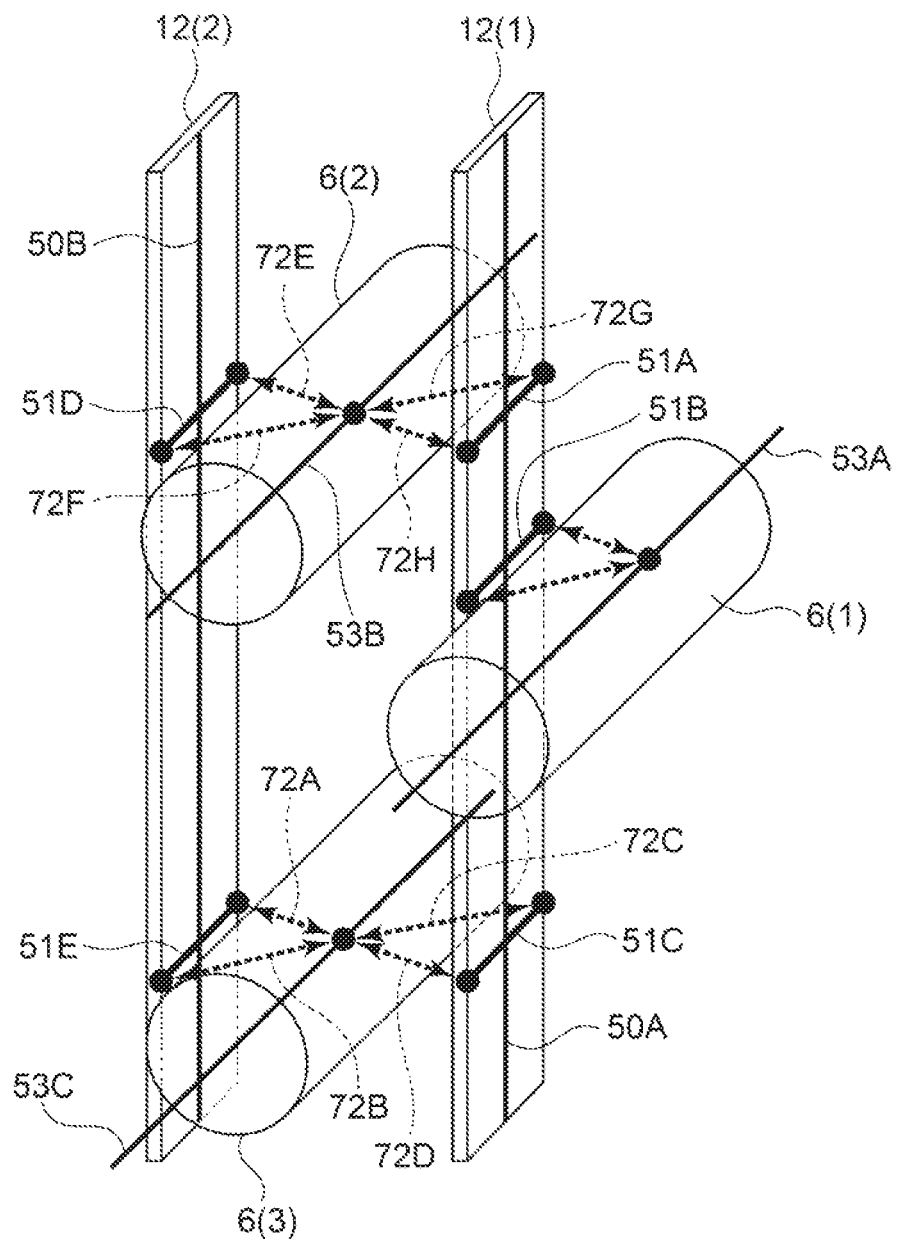
FIG. 12 is a diagram showing a vibration damping structure in which a heat-transfer tube is supported by friction between two anti-vibration members, using one-dimensional elements and gap elements.

In accordance with this embodiment, the FEM model for modeling an interaction between the heat-transfer tube 6 and the anti-vibration member 12 will now be described with reference to FIG. 12. The embodiment shown in FIG. 12 is same as the embodiment described with FIG. 6 in that the FEM model includes the plurality of first one-dimensional elements 53 extending to represent the respective heat-transfer tubes 6 included in the heat-transfer tube bundle 10. Also, the embodiment shown in FIG. 12 is same as the embodiment described with FIG. 6 in that the FEM model includes the second one-dimensional element 50 extending to along the longitudinal direction of the anti-vibration member 12. However, the embodiment shown in FIG. 12 differs from the embodiment described with FIG. 6 in that the FEM model further includes a third one-dimensional element 51 extending along the width direction of the anti-vibration member 12. The third one-dimensional element 51 includes a pair of gap elements 72 which represent the shortest distance between each end of the third one-dimensional element 72 and the first one-dimensional element 53.

In the embodiment shown in FIG. 12, the FEM model element which describes the anti-vibration member 12 further includes, in addition to the second one-dimensional element 50 extending along the longitudinal direction, the third one-dimensional element 51 extending along the width direction of the anti-vibration member 12. In addition, in the embodiment shown in FIG. 12, the gap element modeling the amount of gap between each heat-transfer tube 6 and each anti-vibration member 12 is defined as the pair of gap elements 72 which represent the shortest distance between each end of the third one-dimensional element 51 and the first one-dimensional element 53 extending along the longitudinal direction of each heat-transfer tube 6.

For instance, in FIG. 12, a third one-dimensional element 51D extending along the width direction of the anti-vibration member 12(2) is provided to represent the twist amount in accordance with the angular offset in the width direction of the anti-vibration member 12(2) with respect to the extension direction of the heat-transfer tube 6(2). Further, a pair of gap elements 72E and 72D are set between the first one-dimensional element 53B corresponding to the heat-transfer tube 6(2) and the third one-dimensional element 51D corresponding to the anti-vibration member 12(2) to represent an interaction between the heat-transfer tube 6(2) and the anti-vibration member 12(2). Similarly, a third one-dimensional element 51E extending along the width direction of the anti-vibration member 12(2) is provided to represent the twist amount in accordance with the angular offset in the width direction of the anti-vibration member 12(2) with respect to the extension direction of the heat-transfer tube 6(3). Further, a pair of gap elements 72A and 72B are set between the first one-dimensional element 53C corresponding to the heat-transfer tube 6(3) and the third one-dimensional element 51E corresponding to the anti-vibration member 12(2) to represent an interaction between the heat-transfer tube 6(3) and the anti-vibration member 12(2).

Similarly, a third one-dimensional element 51A extending along the width direction of the anti-vibration member 12(1) is provided to represent the twist amount in accordance with the angular offset in the width direction of the anti-vibration member 12(1) with respect to the extension direction of the heat-transfer tube 6(2). Further, a pair of gap elements 72G and 72H are set between the first one-dimensional element 53B corresponding to the heat-transfer tube 6(2) and the third one-dimensional element 51A corresponding to the anti-vibration member 12(1) to represent an interaction between the heat-transfer tube 6(2) and the anti-vibration member 12(1). Similarly, a third one-dimensional element 51C extending along the width direction of the anti-vibration member 12(1) is provided to represent the twist amount in accordance with the angular offset in the width direction of the anti-vibration member 12(1) with respect to the extension direction of the heat-transfer tube 6(3). Further, a pair of gap elements 72C and 72D are set between the first one-dimensional element 53C corresponding to the heat-transfer tube 6(3) and the third one-dimensional element 51C corresponding to the anti-vibration member 12(1) to represent an interaction between the heat-transfer tube 6(3) and the anti-vibration member 12(1).

Here, consider a case where, in FIG. 12, the interference represented by the gap element 72A between the heat-transfer tube 6(3) and the anti-vibration member 12(2) exceeds the physical gap amount between the heat-transfer tube 6(3) and the anti-vibration member 12(2). In this case, the contact force corresponding to the twist load of the anti-vibration member 12(2) acts between one end in the width direction of the anti-vibration member 12(2) and the contact surface of the heat-transfer tube 6(3). Similarly, consider a case where the interference represented by the gap element 72B between the heat-transfer tube 6(3) and the anti-vibration member 12(2) exceeds the physical gap amount between the heat-transfer tube 6(3) and the anti-vibration member 12(2). In this case, the contact force corresponding to the twist load of the anti-vibration member 12(2) acts between the other end in the width direction of the anti-vibration member 12(2) and the contact surface of the heat-transfer tube 6(3). It is needless to say that the same interaction acts between the heat-transfer tube 6(2) and the anti-vibration member 12(2), and the same interaction acts between the heat-transfer tube 6(2) and 6(3) and the anti-vibration member 12(1).

Accordingly, the following loading conditions are imposed on the gap elements 72A and 72B representing the interaction between the heat-transfer tube 6(3) and the anti-vibration member 12(2). That is, when the interference represented by the gap elements 72A or 72B is less than the physical gap amount between the heat-transfer tube 6(3) and the anti-vibration member 12(2), the contact force between the anti-vibration member 12(2) and the heat-transfer tube 6(3) is left zero. On the other hand, when the interference exceeds the physical gap amount between the heat-transfer tube 6(3) and the anti-vibration member 12(2), the contact force corresponding to the twist load acts on either end in the width direction of the anti-vibration member 12(2). Accordingly, in this case, a spring constant model generating a spring load in accordance with exceedance by which the gap amount exceeds the physical gap amount is set for the gap element 72A or 72B. The same loading condition is imposed on the gap elements 72C to 72H as the loading condition imposed on the gap elements 72A and 72B.

As described above, in the FEM model shown in FIG. 12, the contact surface of the anti-vibration member 12 has a width along the length direction of each of the heat-transfer tubes 6 so as to establish a surface contact with each of the heat-transfer tubes 6. Further, in the FEM model shown in FIG. 12, the width direction on the contact surface of the anti-vibration member 12 with the above width has an angular offset with respect to the length direction of the heat-transfer tube 6, so that the contact surface of the anti-vibration member 12 has twist with respect to the length direction of the heat-transfer tube 6. Accordingly, in the FEM model shown in FIG. 12, the contact surface of the anti-vibration member 12 abuts on the heat-transfer tube 6 at least partially on the width in accordance with the twist. As a result, in the embodiment shown in FIG. 12, it is possible to appropriately simulate, based on the FEM model, a structural dynamic characteristic in which only the twist load of the anti-vibration member 12 acts on the heat-transfer tube 6 in a state where the anti-vibration member 12 abuts on the tube only at one end in the width direction of the contact surface.

Further, in this embodiment, the error parameter c reflected in the FEM model by the error parameter setting part 212 further includes an error parameter ε reflected in the gaps 72A to 72H by the error parameter setting part 212. More specifically, the error parameter ε reflected in the gaps 72A to 72H corresponds to a tolerance which represents variation in twist amount of the anti-vibration member 12 caused by an angular offset when the contact surface of the anti-vibration member 12 has the angular offset with respect to the extension direction of the heat-transfer tube 3.

As described above, in this embodiment, the second element corresponding to the anti-vibration member 12 is represented by the second one-dimensional element 50 and the third one-dimensional element 51 in a two-dimensional manner, and the pair of gap elements 72 are provided as the third element between each end of the third one-dimensional element 51. Thereby, it is possible to reproduce a high-dimensional behavior, such as twist of the anti-vibration member 12 with respect to each heat-transfer tube 6 constituting the heat-transfer tube bundle 10, as a behavior close to reality, and it is possible to achieve more precise structural analysis.

In another illustrative embodiment, the FEM model is generated for the heat-transfer tube bundle 10 including the heat-transfer tubes 3 each of which has a first straight tube part 4 positioned on a fluid inlet side, a second straight tube part 5 positioned on a fluid outlet side, and a bent part 6 positioned between the first straight tube part 4 and the second straight tube part 5. In this embodiment, as shown in FIG. 13, the first straight tube part 4 and the second straight tube part 5 are inserted into through holes 9 (9(1) to 9(6)) formed in the tube support plate 7 for supporting the heat-transfer tube bundle 10.

As described with reference to FIG. 1, the anti-vibration member 12 in the heat-transfer tube bundle 10 is configured to restrict movement of the plurality of heat-transfer tubes 3 in the out-of-plane direction D1 perpendicular to the plane including the bent parts 6. Additionally, in the heat-transfer tube bundle 10 shown in FIG. 1, the through holes 9 (9(1) to 9(6)), for receiving the first straight tube parts 4 and the second straight tube parts 5 of the heat-transfer tubes 3, are arranged in accordance with a pattern in a top view of the tube support plate 7 so that the bent parts 6 with different curvature radii are arranged along the in-plane direction D2 parallel to the above plane, and the bent parts 6 with the same curvature radius are arranged along the out-of-plane direction D1.

This embodiment will now be described in detail with reference to FIG. 13. In this embodiment, the bending load which acts between the heat-transfer tube 3 and the anti-vibration member 12 is evaluated further considering interference caused when a position of inserting the first straight tube part 4 and the second straight tube part 5 into the through holes 9 in the tube support plate 7 is deviated from the center of the through hole 9 among the interference between the heat-transfer tube 3 and the anti-vibration member 12. Further, in this embodiment, the contact force applied to the bent part 6 of the heat-transfer tube 3 from the anti-vibration member 12 is evaluated based on the bending load evaluated, further considering the interference caused when the insertion position of the heat-transfer tube 3 is deviated from the center of the through hole 9.

Figure 13:
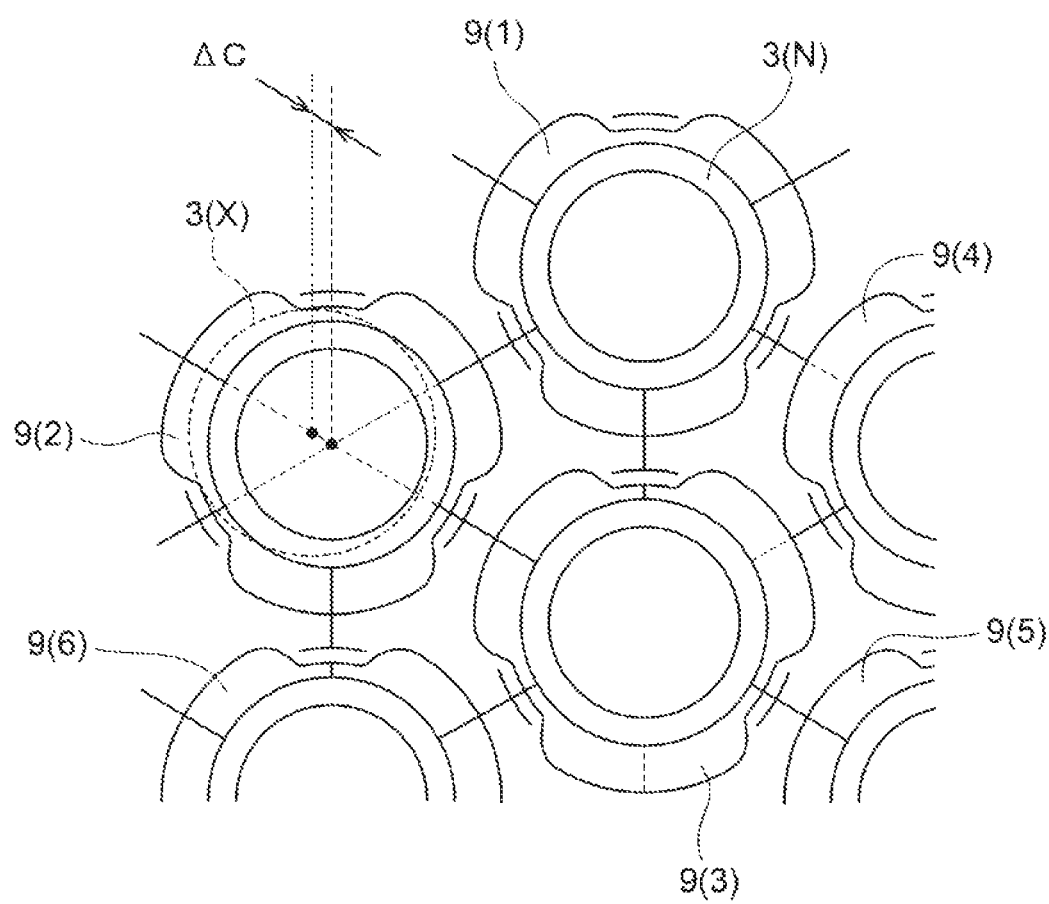
FIG. 13 is a diagram showing eccentricity amount of heat-transfer tube straight tube parts inserted into through holes provided in a tube support plate.

For instance, as shown in FIG. 13, when the heat-transfer tube 3(X) is inserted into the through hole 9(2) provided in the tube support plate 7, the center of a circular cross-section of the heat-transfer tube 3(X) is deviated from the center of the through hole 9(2). In this case, the eccentricity amount of the insertion position of the straight tube part in the through hole 9(2) shown in FIG. 13 is represented by distance ΔC between the center of the circular cross-section of the heat-transfer tube 3(X) and the center of the through hole 9(2). Moreover, in this embodiment, the error parameter ε includes a tolerance which represents variation in magnitude of deviation of the insertion position of the first straight tube part 4 and the second straight tube part 5 in the through hole 9 in the tube support plate 7 from the center of the through hole 9. In brief, in this embodiment, in step S2 of FIG. 5, the eccentricity amount of the insertion position of the first straight tube part 4 and the second straight tube part 5 in the through holes 9 (9(1) to 9(6)) shown in FIG. 13 is included in the error parameter e. Under this condition, in this embodiment, in step S3 of FIG. 5, structural analysis is performed to evaluate the damping force of the heat-transfer tube bundle 10.

As described above, in this embodiment, structural analysis is performed on the vibration damping structure including the plurality of anti-vibration members 12 and the plurality of heat-transfer tubes 3 constituting the heat-transfer tube bundle 10 by the finite-element method using the FEM model, in consideration of a structure in which the straight tube parts of each heat-transfer tube 3 are inserted to the through holes 9 formed in the tube support plate 7 for supporting the heat-transfer tube bundle 10. Further, in this embodiment, the eccentricity amount of the insertion position of the straight tube parts in the through holes 9 is included in the error parameter ε to perform the structural analysis. Accordingly, in this embodiment, it is possible to perform the structural analysis, in consideration of increase and decrease in contact load when the contact load applied to the anti-vibration member 12 from the bent part 6 adjoining the straight tube parts of each heat-transfer tube 3 increases or decreases due to the eccentricity amount ΔC of the insertion position of the straight tube parts in the through holes 9. Further, in this embodiment, it is possible to perform the structural analysis, in consideration of variation due to an error of the eccentricity amount ΔC of the insertion position of the straight tube parts in the through holes 9.

REFERENCE SIGNS LIST

4 First straight tube part
5 Second straight tube part
6 (6a1, 6a2, 6a3, 6b1, 6c1) Bent part
7 Tube support plate
8 Tube array
10 Heat-transfer tube bundle
10a Bent portion
11 First retention member
12 Anti-vibration member
12a End part
14 Second retention member
20 Computer device
21 Computing unit
22 Storage unit
22a Program
22b Data
23 Output unit
24 Input unit
50 (50A, 50B) Second one-dimensional element
51 (51A to 51E) Third one-dimensional element
53 (53A, 53B, 53C) First one-dimensional elements
62 (62A to 62D) Gap element
72 (72A to 72H) Gap element
211 FEM model making part
212 Error parameter setting part
213 Analysis part
D1 Out-of-plane direction
D2 In-plane direction
G Flow direction
K Spring constant

The invention claimed is:

1. A method for performing analysis by using a computer device to analyze a vibration damping structure in which a tube bundle disposed in a fluid is supported by a vibration damping member having a plate-like shape disposed in a gap between tubes each having a cylindrical shape included in the tube bundle, the method comprising:
a model making step of making a FEM model corresponding to the vibration damping structure;
an error setting step of setting an error parameter for a parameter relating to an element included in the FEM model;
an analysis step of performing structural analysis by a finite-element method using the FEM model in which the error parameter is set, the finite-element method being repeatedly performed until at least one of a compression load or a bending load acting between the vibration damping member and the tubes is converged to an equilibrium state in the tube bundle; and
using a size tolerance for at least one of the tubes and the vibration damping member of the vibration damping structure based on a result of the analysis step to manufacture the at least one of the tubes and the vibration damping member of the vibration damping structure,
wherein the FEM model includes
a first element corresponding to the tube bundle,
a second element including a one-dimensional element corresponding to the vibration damping member, and
a third element corresponding to a gap amount between the tube bundle and the vibration damping member,
wherein the first element includes a plurality of first one-dimensional elements extending to respectively correspond to the tubes included in the tube bundle,
wherein the second element includes a second one-dimensional element extending along a longitudinal direction of the vibration damping member and a third one-dimensional element extending along a width direction of the vibration damping member,
wherein the third element includes a pair of gap elements representing a shortest distance between each end of the third one-dimensional element and each first one-dimensional element,
wherein the error parameter includes a twist amount with respect to an extension direction of the tubes included in the tube bundle, when the vibration damping member is viewed from a cross-sectional direction perpendicular to the longitudinal direction of the vibration damping member,
wherein the twist amount is a manufacturing error randomly distributed in accordance with a manufacturing tolerance distribution of the vibration damping member;
wherein the error parameter is set based on data measured on the vibration damping structure,
wherein the analysis step imposes a loading condition set so that, when the gap amount is less than a predetermined value, a contact force applied to each first one-dimensional element from the second one-dimensional element increases with an increase in interference, and
wherein the loading condition is defined as a spring load obtained by multiplying a displacement amount applied to a spring by an external force in proportion to the physical interference by a spring constant.

2. The method for analyzing a vibration damping structure according to claim 1,
wherein the error parameter includes a random number.

3. The method for analyzing a vibration damping structure according to claim 1,
wherein the error parameter includes at least one of an outer diameter, a thickness, and a warpage of a tube included in the tube bundle, and a thickness and a warpage of the vibration damping member.

4. The method for analyzing a vibration damping structure according to claim 1,
wherein each of the tubes included in the tube bundle has a first straight tube part positioned on a fluid inlet side, a second straight tube part positioned on a fluid outlet side, and a bent part positioned between the first straight tube part and the second straight tube part,
wherein the first straight tube part and the second straight tube part are inserted into a plurality of through holes formed in a tube support plate for supporting the tube bundle, and
wherein, in the analysis step, the error parameter includes an eccentricity amount of an insertion position, at which the first straight tube part and the second straight tube part are inserted into the through holes, to perform the structural analysis.

* * * * *